(12) United States Patent
Liu et al.

(10) Patent No.: US 10,579,200 B2
(45) Date of Patent: Mar. 3, 2020

(54) TOUCH SUBSTRATE, TOUCH PANEL USING THE SAME AND METHOD FOR MANUFACTURING THE SAME

(71) Applicants: BOE TECHNOLOGY GROUP CO., LTD., Beijing (CN); Chengdu BOE Optoelectronics Technology Co., Ltd., Chengdu, Sichuan (CN)

(72) Inventors: Yangsheng Liu, Beijing (CN); Yue Long, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 16/107,968

(22) Filed: Aug. 21, 2018

(65) Prior Publication Data
US 2019/0204963 A1 Jul. 4, 2019

(30) Foreign Application Priority Data
Jan. 3, 2018 (CN) .......................... 2018 1 0004469

(51) Int. Cl.
*G06F 3/041* (2006.01)
*G06F 3/047* (2006.01)
*G06F 3/044* (2006.01)

(52) U.S. Cl.
CPC ............. *G06F 3/047* (2013.01); *G06F 3/044* (2013.01); *G06F 3/0446* (2019.05); *G06F 3/04164* (2019.05); *G06F 2203/04103* (2013.01)

(58) Field of Classification Search
CPC ................................. G06F 3/044; G06F 3/047
See application file for complete search history.

(56) References Cited

U.S. PATENT DOCUMENTS

| 2010/0231549 | A1* | 9/2010 | Chien | ................. G02F 1/13338 345/174 |
| 2015/0162387 | A1* | 6/2015 | Gu | ........................ G06F 3/0412 345/174 |
| 2016/0041644 | A1* | 2/2016 | Bae | ......................... G06F 3/044 345/174 |
| 2017/0147103 | A1* | 5/2017 | Han | ...................... G06F 1/1652 |

\* cited by examiner

*Primary Examiner* — Roy P Rabindranath
(74) *Attorney, Agent, or Firm* — Foley & Lardner LLP (57) ABSTRACT

The present disclosure relates to a touch substrate, including a base substrate, having a peripheral wiring area and a pin area, a plurality of first touch electrodes, provided on the base substrate, a plurality of second touch electrodes, provided on the base substrate and interleaved and insulated from the plurality of first touch electrodes, and a detection wiring, both ends of the detection wiring are located in the pin area to form a detection pin, and the detection wiring has a plurality of bending portions distributed along an extending direction of the peripheral wiring area, each of the bending portions has a first touch electrode sensing portion that forms a first sensing capacitor by cooperating with a first touch electrode, and a second touch electrode sensing portion that forms a second sensing capacitor by cooperating with a second touch electrode.

18 Claims, 5 Drawing Sheets

TOUCH SUBSTRATE, TOUCH PANEL USING THE SAME AND METHOD FOR MANUFACTURING THE SAME

CROSS REFERENCE

The present application claims the priority of Chinese Patent Application No. 201810004469.0, filed on Jan. 3, 2008, and the entire contents thereof are incorporated herein by reference as part of the present application.

TECHNICAL FIELD

The present disclosure relates to the field of display technologies, and in particular, to a touch substrate.

BACKGROUND

Organic light-emitting diodes (OLED) devices are widely used in mobile phone screens, computer monitors, and etc., because OLED has outstanding advantages of self-illumination, fast response, low driving voltage, high contrast, wide color gamut, and high luminous efficiency. Among them, flexible OLED display devices have become a main direction of research and development in the field of display technology in virtue of the bendable and portable properties.

At present, the most difficult problem that restricts the development of flexible OLED devices is that the lifetime of OLED devices is too short. The main reason is that materials of an electrode layer and a luminescent layer constituting the OLED device are quite sensitive to moisture and oxygen in the atmosphere, and performance of the device is weakened after subject to water and oxygen erosion. At present, a common TFE (Thin Film Encapsulation) encapsulation structure is a film structure of an inorganic material, an organic material and an inorganic material, and an EL (Electroluminescence) luminescent material is encapsulated inside the device, to achieve water blocking and oxygen blocking, and in turn provide protection for EL materials. It is extremely important to detect cracks of the encapsulation. It is beneficial to improve product quality and reduce cost if edge cracks of the encapsulation can be effectively detected before shipment. At present, the commonly used panel crack detection (PCD) method is to make a peripheral wiring at edges of the display device. When a crack occurs, the metal wiring will break, and a resistance at both ends is measured to determine whether a crack occurs.

In summary, the above PCD method of detecting the occurrence of cracks by detecting the resistance at both ends of the metal wiring can only detect whether the device has cracks, but it cannot accurately locate the crack.

SUMMARY

According to some arrangements of the present disclosure, there is provided a touch substrate, including: a base substrate, having a peripheral wiring area and a pin area; a plurality of first touch electrodes, provided on the base substrate; a plurality of second touch electrodes, provided on the base substrate and interleaved and insulated from the plurality of first touch electrodes; and a detection wiring, both ends of the detection wiring are located in the pin area to form a detection pin, and the detection wiring has a plurality of bending portions distributed along an extending direction of the peripheral wiring area, each of the bending portions has a first touch electrode sensing portion that forms a first sensing capacitor by cooperating with a first touch electrode, and a second touch electrode sensing portion that forms a second sensing capacitor by cooperating with a second touch electrode.

Optionally, the touch substrate further includes: a first insulating layer, disposed between the first touch electrode and the second touch electrode.

Optionally, the first touch electrode and the first signal wiring are in the same layer.

Optionally, the second touch electrode, the second signal wiring and the detection wiring are in the same layer.

Optionally, the touch substrate further includes: a second insulating layer, disposed on the second touch electrode, the second signal wiring and a layer of the detection wiring.

Optionally, there is a gap between an end of the first touch electrode and an end the second touch electrode, and a portion of the bending portions of the detection wiring extends into the gap.

Optionally, each of the first touch electrodes is electrically connected to each other by a plurality of diamond electrode blocks; each of the second touch electrodes is electrically connected to each other by a plurality of diamond electrode blocks; and the gap exists between an end portion of an orthographic projection of each of the second touch electrodes on the base substrate and an orthographic projection of a first touch electrode at a corresponding position on the base substrate.

Optionally, each of the first touch electrodes has a strip shape, and each of the second touch electrodes has a strip shape.

Optionally, the bending portion of the detection wiring corresponds to the gap one to one, and in each pair of mutually corresponding bending portions and gaps, an end portion of the bending portion extends into the gap.

The present disclosure further provides a touch panel display device, including any one of the touch substrates provided by the above technical solutions.

The present disclosure provides a method of for manufacturing a touch substrate, including forming first touch electrodes and first signal wirings on a base substrate, the base substrate has a peripheral wiring area and a pin area, and the first touch electrodes and the first signal wirings are in one-to-one correspondence, and one end of each of the first signal wirings is electrically connected to the first touch electrode, and the other end thereof is located in the pin area of the base substrate to form a first pin; forming a first insulating layer on the first touch electrode and the first signal wiring; forming a second touch electrode, a second signal wiring and a detection wiring on the first insulating layer, the second touch electrode is interleaved and insulated from the first touch electrodes, the second touch electrodes are in one-to-one correspondence with the second signal wirings, and one end of each of the second signal wirings is electrically connected to the second touch electrode, and the other end thereof is located in the pin area of the base substrate to form a second pin, the detection wiring has a plurality of bending portions distributed along an extending direction of the peripheral wiring area of the base substrate, each of the bending portions has a first touch electrode sensing portion that forms a first sensing capacitor by cooperating with a first touch electrode to, and a second touch electrode sensing portion that forms a second sensing capacitor by cooperating with a second touch electrode.

The arrangement of the present disclosure provides a touch substrate including: a base substrate, first touch electrodes formed on the base substrate and first signal wrings corresponding to the first touch electrodes one to one, one end of each of the first signal wirings is connected to the touch electrode, and the other end is connected to the first pin; second touch electrodes formed on the base substrate and second signal wirings corresponding to the second touch electrodes one to one, and a detection wiring, two ends of the detection wiring are respectively connected with the detection pin, one end of each of the second signal wirings is connected to the touch electrode, and the other end is connected to the second pin; an insulating layer exists between the first touch electrode and the second touch electrode, to ensure that the first touch electrodes and the second touch electrodes are insulated from each other.

BRIEF DESCRIPTION OF THE DRAWINGS

In order to more clearly illustrate the technical solutions in the arrangements of the present disclosure, the following drawings used in the description of the arrangements will be briefly described. It is obvious that the drawings in the following description are only some arrangements of the present disclosure, those skilled in the art can also obtain other drawings based on these drawings without paying for inventive labor.

DETAILED DESCRIPTION

In order to make the objects, technical solutions and advantages of the present disclosure more clear, the following will be described in detail with reference to the accompanying drawings. It is apparent that the described arrangements are only a few exemplary arrangements of the present disclosure, and not all of the arrangements. All other arrangements obtained by a person of ordinary skill in the art based on the arrangements of the present disclosure without creative work all belong to the scope of the present disclosure.

Figure 1:
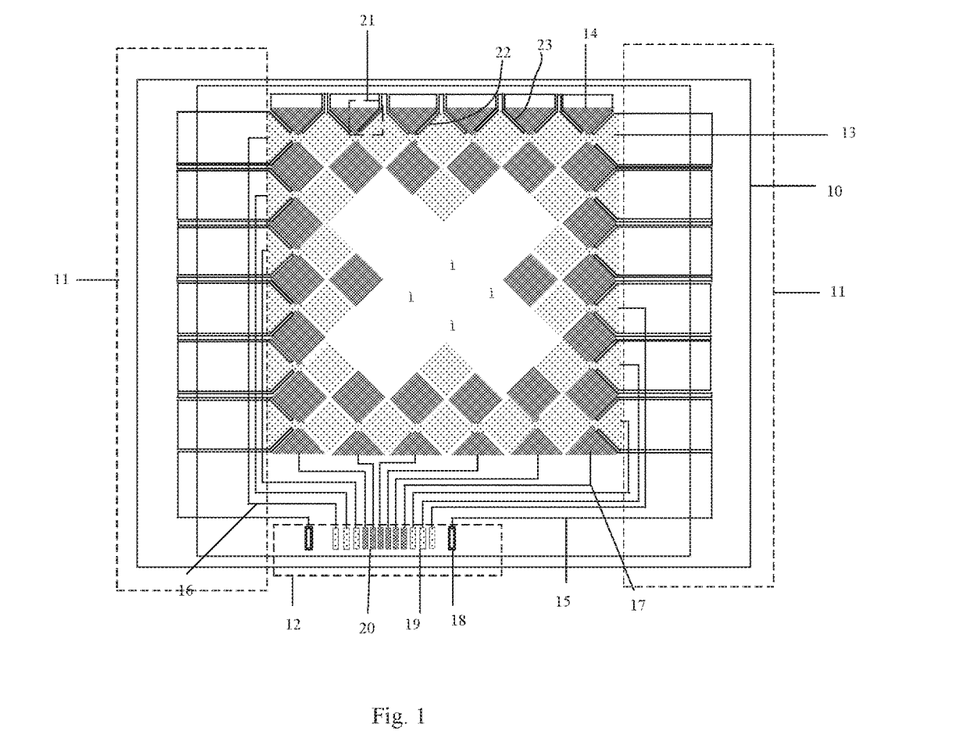
FIG. 1 is a schematic diagram of a wiring manner of a detection wiring of a detection circuit according to an arrangement of the present disclosure.

As shown in FIG. 1, an arrangement of the present disclosure provides a touch substrate, including: a base substrate 10, having a peripheral wiring area 11 and a pin area 12; a plurality of first touch electrodes 12, provided on the base substrate, a plurality of second touch electrodes 14, provided on the base substrate 10 and interleaved and insulated from the plurality of first touch electrodes 13; and a detection wiring 15, both ends of the detection wiring are located in the pin area to form a detection pin 18, and the detection wiring 15 has a plurality of bending portions 21 distributed along an extending direction of the peripheral wiring area, each of the bending portions has a first touch electrode sensing portion 22 that forms a first sensing capacitor by cooperating with a first touch electrode 13, and a second touch electrode sensing portion 23 that forms a second sensing capacitor by cooperating with a second touch electrode 14.

In the arrangement of the present disclosure, firstly, the resistance of two ends of the detection wiring is measured by detecting the pin. If the resistance of the detection wiring is less than a certain set value, it is determined that the detection wiring is normal and not broken. If the resistance of the detection wiring is greater than a certain set value, it is determined that the detection wiring has broken. Then, in order to determine a specific location of the breakage, it is necessary to measure a sensing capacitance between the detection wiring and the touch electrode, and the operation may include: transmitting a pulse signal to the detection pin and a pin connected to the touch electrode, and measuring the pin connected to the signal wiring connected to the touch electrode and the detection pin to obtain a sensing capacitance between the detection wiring and the touch electrode, and then, a position of the breakage is determined according to the sensing capacitance value. If the sensing capacitance between the detection pin and the pin connected to the touch electrode is a preset value, it is determined that the position of the detection wiring is broken. Otherwise, if the sensing capacitance between the detection pin and the pin connected to the touch electrode is not a certain set value, it is determined that the position of the detection wiring is normal. By way of the above method, the specific breakage location of the encapsulation can be effectively detected and operating efficiency can be improved.

Optionally, the touch substrate further includes: a first insulating layer 30, disposed between the first touch electrode 13 and the second touch electrode 14. The insulating layer 30 is further disposed between the first touch electrode 13 and the second touch electrode 14, which achieves insulation between the first touch electrode and the second touch electrode 14.

In practice, if the first touch electrode 13 and the second touch electrode 14 are in the same layer, the connection between the first touch electrode 13 and the second touch electrode 14 can be achieved by a bridge connection.

Figure 2:
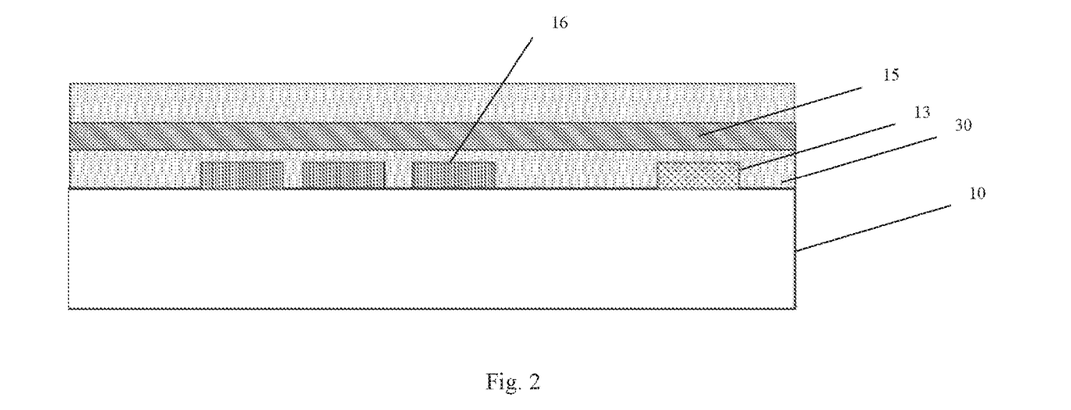
FIG. 2 is a cross-sectional view of a left end of a touch substrate of a device according to an arrangement of the present disclosure.
Figure 3:
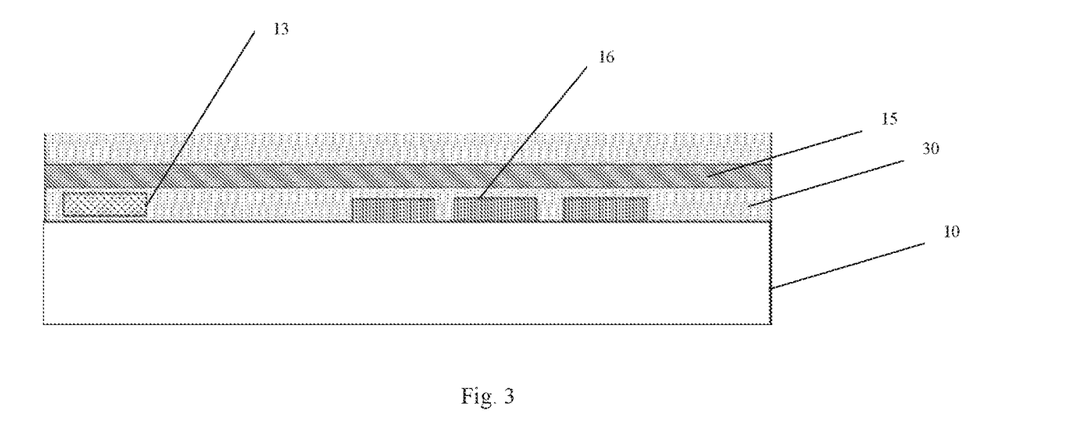
FIG. 3 is a cross-sectional view of a right end of a touch substrate of a device according to an arrangement of the present disclosure.
Figure 4:
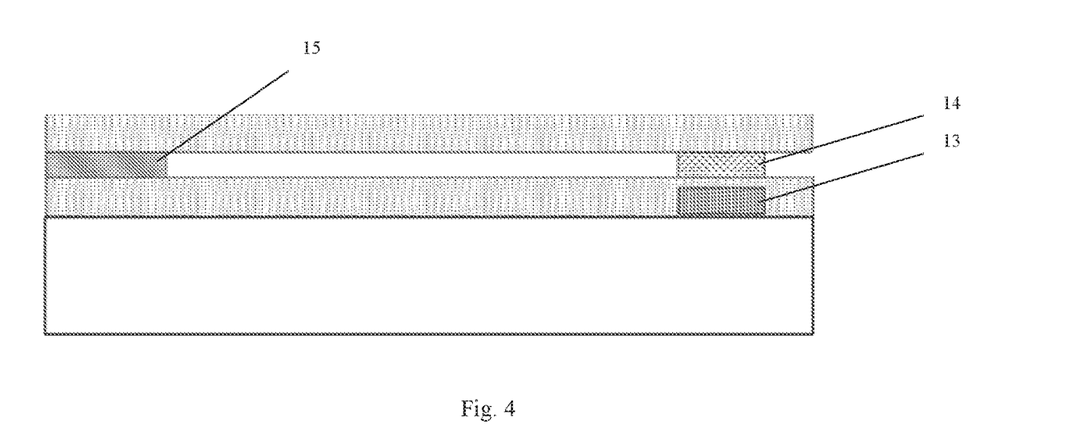
FIG. 4 is a cross-sectional view of top of the device according to the arrangement of the present disclosure.

Optionally, as can be seen from FIG. 2, FIG. 3 and FIG. 4, FIG. 2 is a cross-sectional view of a left end of a touch substrate of a device according to an arrangement of the present disclosure; FIG. 3 is a cross-sectional view of a right end of a touch substrate of a device according to an arrangement of the present disclosure; FIG. 4 is a cross-sectional view of top of the device according to the arrangement of the present disclosure, the touch substrate further includes: a second insulating layer, disposed on the second touch electrode 14, the second signal wiring 17 and a layer of the detection wiring 15. The insulating layer 30 is further provided on the second touch electrode 14, the second signal wiring 17 and the detection wiring 15, which is mainly for preventing contact between the device and air, thus improving the life of the device.

Optionally, the first touch electrode 13 and the first signal wiring 16 are in the same layer.

Figure 5:
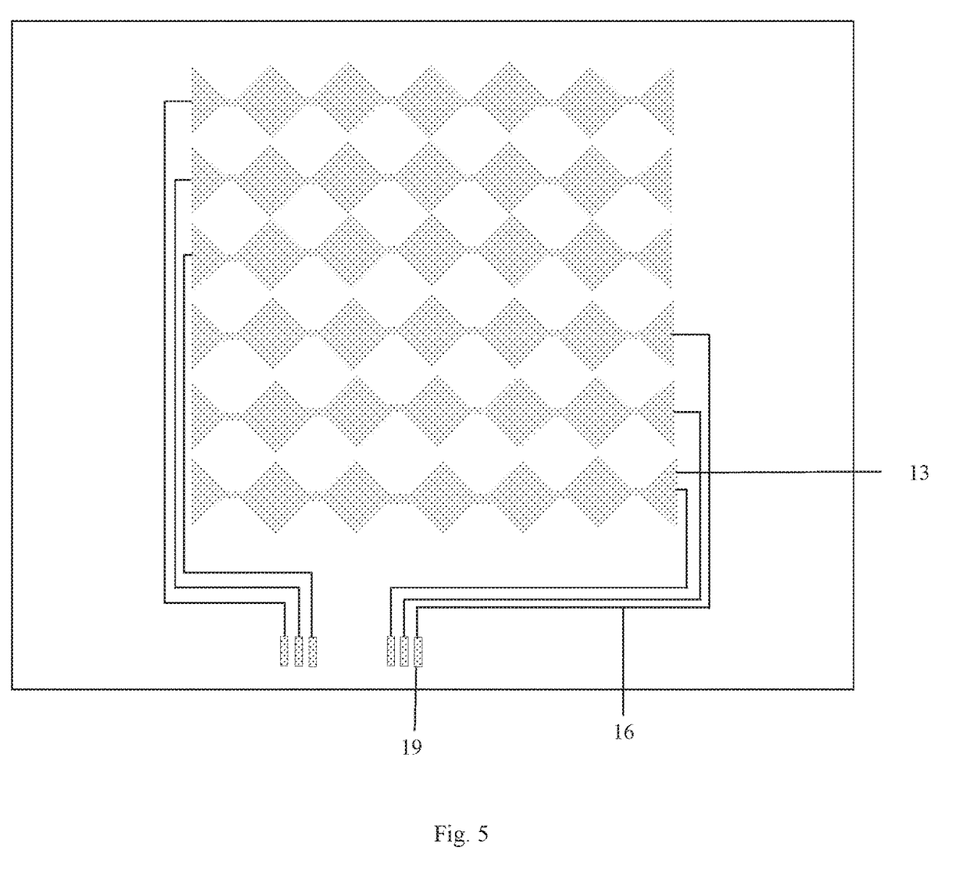
FIG. 5 is a schematic structural view with the first layer of the touch electrode is completed according to the arrangement of the present disclosure.

FIG. 5 is a schematic structural view with the first layer of the touch electrode 13 is completed according to the arrangement of the present disclosure. It can be seen that all of the first touch electrode 13, the first signal wiring 16 and the first pin 19 are in the same layer.

The first touch electrode 13 and the first signal wiring 16 are in the same layer, which can reduce a thickness of the touch substrate and facilitate the electrical connection between the first touch electrode 13 and the first signal wiring 16.

Optionally, the second touch electrode 14, the second signal wiring 17 and the detection wiring 15 are in the same layer.

FIG. 1 is a schematic structural view with the second layer of the touch electrode is completed according to the arrangement of the present disclosure. it can be seen that the second touch electrode 14, the second signal wiring 17 and the detection wiring 15 and the second pin 20 are in the same layer.

As described as above, the second touch electrode 14 is in the same layer as the first signal wiring 17, to facilitate electrical connection between the second touch electrode 14 and the second signal wiring 17.

The detection wiring 15 is in the same layer as the second touch electrode 14 and the second signal wiring 17, which achieves insulation between the detection wiring 15 and the first signal wiring 17.

If the detection wiring is in the same layer as the first touch electrode 13 and the first signal wiring 16, when the bending portion 21 of the detection wiring 15 extends into the gap between the first touch electrode 13 and the second touch electrode 14, it would be difficult to insulate the detection wiring 15 from the first signal wiring 16. Therefore, when the detection wiring 15 is in the same layer as the second touch electrode 14 and the second signal wiring 17, as shown in FIG. 1, the mutual insulation between the detection wiring 15 and the first signal wiring 16, the second signal wiring 17 is facilitated, and the manufacturing process of the touch substrate is simplified.

Optionally, ends of the first touch electrode 13 and the second touch electrode 14 form a gap, and a portion of the bending portions of the detection wiring 15 extends into the gap.

Optionally, each of the first touch electrodes 13 is electrically connected to each other by a plurality of diamond electrode blocks; each of the second touch electrodes 14 is electrically connected to each other by a plurality of diamond electrode blocks; and the gap exists between an end portion of an orthographic projection of each of the second touch electrodes 14 on the base substrate 10 and an orthographic projection of a first touch electrode 13 at a corresponding position on the base substrate 10.

Optionally, the bending portion 21 of the detection wiring 15 corresponds to the gap one to one, and in each pair of mutually corresponding bending portions and gaps, an end portion of the bending portion 21 extends into the gap.

In the arrangement, the one-to-one correspondence between the bending portion 21 of the detection wiring and the gap is mainly for improving accuracy.

In the first case, when the touch electrode is a diamond electrode block, FIG. 1 shows the wiring method for detecting the position of breakage of the touch substrate of the device according to the arrangement of the present disclosure.

In FIG. 1, it can be seen that an orthographic projection of the first touch electrode 13 between any two adjacent second touch electrodes 14 on the base substrate 10 is a diamond shape; and an orthographic projection of the second touch electrode 14 between any two adjacent first touch electrodes 13 on the base substrate 10 is a diamond shape; a gap is formed between the first touch electrode 13 and the second touch electrode 14, and a part of the detection wiring 15 extends into the gap; a sensing capacitance is formed between the first touch electrode sensing portion 22 and the first touch electrode 13, and a sensing capacitance is formed between the second touch electrode sensing portion 23 and the second touch electrode 14, for determining a specific breakage location of the device.

Optionally, the bending portion of the detection wiring corresponds to the gap one to one, and in each pair of mutually corresponding bending portions and gaps, an end portion of the bending portion extends into the gap.

As shown in FIG. 1, the bending portion of each of the detection wirings has a one-to-one correspondence with the gap between the first touch electrodes 13 and the second touch electrodes 14.

That is, the bending portion 21 of one of the detection wirings corresponds to a gap between the first touch electrode 13 and the second touch electrode 14. The advantage is that it can more accurately determine the position where the device breaks.

In the above arrangement, the one-to-one correspondence between the bending portion 21 of the detection wiring and the gap between the first touch electrode 13 and the second touch electrode 14 are mainly used to improve accuracy.

In another case, if the touch electrode itself is strip-shaped, then, optionally, each of the first touch electrodes 13 may have a strip shape, and each of the second touch electrodes 14 may have a strip shape.

Optionally, the bending portion 21 of the detection wiring 15 corresponds to the gap one to one, and in each pair of mutually corresponding bending portions and gaps, an end portion of the bending portion 21 extends into the gap.

In the above, the one-to-one correspondence between the bending portion 21 of the detection wiring and the gap is mainly for the purpose of improving accuracy.

Figure 6:
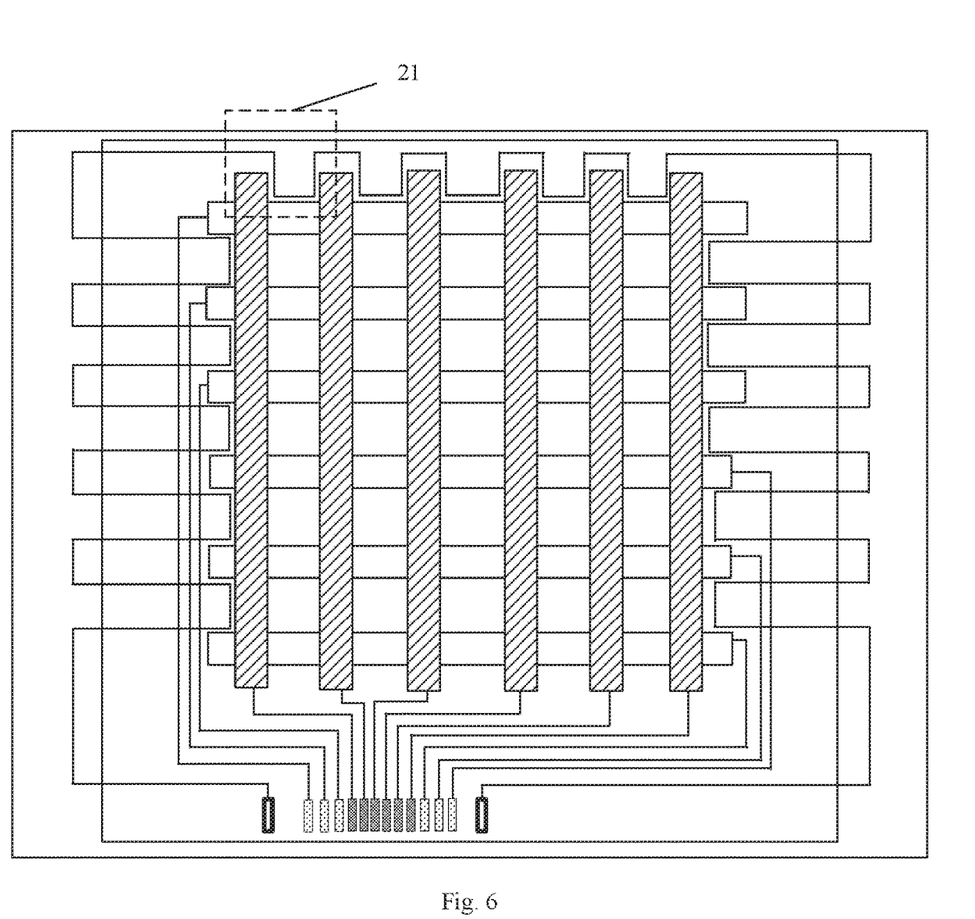
FIG. 6 is a schematic structural diagram of a detection wiring when a touch electrode is in a strip shape according to an arrangement of the present disclosure.

FIG. 6 is a schematic structural diagram of a detection wiring 15 when a touch electrode is in a strip shape according to an arrangement of the present disclosure.

As shown in FIG. 6, the dotted line indicates that the bending portion 21 extends into the gap between the first touch electrode 13 and the second touch electrode 14, and the bending portion 21 is in a one-to-one correspondence with the gap between the first touch electrode 13 and the second touch electrode. That is, a bending portion corresponds to a gap between one of the first touch electrodes 13 and one of the second touch electrodes 14.

Optionally, the arrangement of the present disclosure further provides a touch substrate display device, including the touch substrate as described above.

Figure 7:
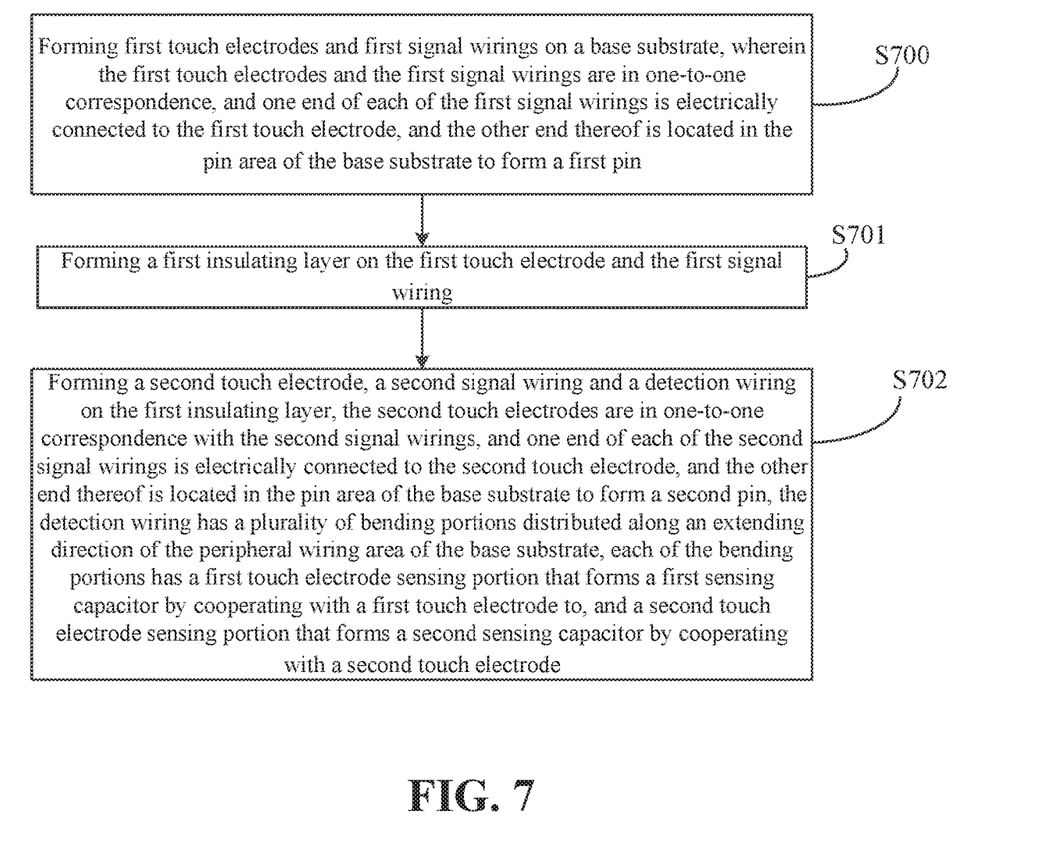
FIG. 7 is a method for manufacturing a touch substrate according to an arrangement of the present disclosure.

Based on the above structure, the arrangement of the present disclosure provides a method for manufacturing a touch substrate. As shown in FIG. 7, the method includes blocks as follows.

In S700, first touch electrodes and first signal wirings are formed on a base substrate. The first touch electrodes and the first signal wirings are in one-to-one correspondence, and one end of each of the first signal wirings is electrically connected to the first touch electrode, and the other end thereof is located in the pin area of the base substrate to form a first pin.

In S701, a first insulating layer is formed on the first touch electrode and the first signal wiring.

In S702, a second touch electrode, a second signal wiring and a detection wiring are formed on the first insulating layer. The second touch electrodes are in one-to-one correspondence with the second signal wirings. One end of each of the second signal wirings is electrically connected to the second touch electrode, and the other end thereof is located in the pin area of the base substrate to form a second pin. The detection wiring has a plurality of bending portions distributed along an extending direction of the peripheral wiring area of the base substrate, each of the bending portions having a first touch electrode sensing portion that forms a first sensing capacitor by cooperating with a first touch electrode to, and a second touch electrode sensing portion that forms a second sensing capacitor by cooperating with a second touch electrode.

As used herein, the term "same layer" refers to the relationship between the layers simultaneously formed in the same step. In one example, an electrode and one or more lines are in a same layer when they are formed as a result of one or more steps of a same patterning process performed in a same layer of material.

The present application has been described above with reference to block diagrams and/or flowchart illustrations of a method, apparatus (system) and/or computer program product according to arrangements of the present application. It will be understood that one block of the block diagrams and/or flowchart illustrations and combinations of blocks of the block diagrams and/or flowchart illustrations can be implemented by computer program instructions. These computer program instructions may be provided to a processor of a general purpose computer, a special purpose computer, and/or other programmable data processing apparatus to produce a machine, such that instructions executed via a computer processor and/or other programmable data processing apparatus create a method of implementing the functions/actions specified in the block diagrams and/or flowchart blocks.

Accordingly, the application can also be implemented in hardware and/or software (including firmware, resident software, microcode, etc.). In addition, the application can take the form of a computer program product on a computer usable or computer readable storage medium having computer usable or computer readable program codes embodied in a medium, for use by an instruction execution system or use in connection with an instruction execution system. In the context of the present application, a computer usable or computer readable medium can be any medium that can contain, store, communicate, transmit, or transport a program, for use by an instruction execution system, apparatus, or device, or use in conjunction with an instruction execution system, apparatus, or device.

It will be apparent to those skilled in the art that various modifications and changes can be made in the present disclosure without departing from the spirit and scope of the present disclosure. Thus, if the modifications and variations of the present disclosure are within the scope of the appended claims and their equivalents, the present disclosure is intended to cover such modifications and variations.

What is claimed is:

1. A touch substrate, comprising:
a base substrate, having a peripheral wiring area and a pin area;
a plurality of first touch electrodes, provided on the base substrate;
a plurality of second touch electrodes, provided on the base substrate and interleaved and insulated from the plurality of first touch electrodes; and
a detection wiring, wherein both ends of the detection wiring are located in the pin area to form a detection pin, and the detection wiring has a plurality of bending portions distributed along an extending direction of the peripheral wiring area, each of the plurality of bending portions has a first touch electrode sensing portion that forms a first sensing capacitor by cooperating with a first touch electrode of the plurality of first touch electrodes, and a second touch electrode sensing portion that forms a second sensing capacitor by cooperating with a second touch electrode of the plurality of second touch electrodes,
wherein there is a gap between an end of the first touch electrode and an end the second touch electrode, and a portion of the plurality of bending portions of the detection wiring extends into the gap, and
wherein each of the plurality of the first touch electrodes is electrically connected to each other by a plurality of diamond electrode blocks; each of the plurality of second touch electrodes is electrically connected to each other by a plurality of diamond electrode blocks; and the gap exists between an end portion of an orthographic projection of each of the plurality of second touch electrodes on the base substrate and an end portion of an orthographic projection of one of the plurality of first touch electrodes at a corresponding position on the base substrate.

2. The touch substrate of claim 1, further comprising:
a first insulating layer, disposed between the first touch electrode and the second touch electrode.

3. The touch substrate of claim 1, wherein the first touch electrode and a first signal wiring are in the same layer.

4. The touch substrate of claim 1, wherein the second touch electrode, a second signal wiring and the detection wiring are in the same layer.

5. The touch substrate of claim 1, further comprising:
a second insulating layer, disposed on the second touch electrode, a second signal wiring and a layer of the detection wiring.

6. The touch substrate of claim 1, wherein each of the plurality of first touch electrodes has a strip shape, and each of the plurality of second touch electrodes has a strip shape.

7. The touch substrate of claim 6, wherein a bending portion of the plurality of bending portions of the detection wiring corresponds to the gap one to one, and in each pair of mutually corresponding bending portions and gaps, an end portion of the bending portion extends into the gap.

8. The touch substrate of claim 1 wherein a bending portion of the plurality of bending portions of the detection wiring corresponds to the gap one to one, and in each pair of mutually corresponding bending portions and gaps, an end portion of the bending portion extends into the gap.

9. A touch panel, comprising the touch substrate of claim 1.

10. A method for manufacturing a touch substrate, comprising:
forming first touch electrodes and first signal wirings on a base substrate, wherein the base substrate has a peripheral wiring area and a pin area, and wherein the first touch electrodes and the first signal wirings are in one-to-one correspondence, and one end of each of the first signal wirings is electrically connected to a first touch electrode of the first touch electrodes, and an other end thereof is located in the pin area of the base substrate to form a first pin;
forming a first insulating layer on the first touch electrode and a first signal wiring of the first signal wirings;
forming a second touch electrode, a second signal wiring and a detection wiring on the first insulating layer, wherein the second touch electrode is interleaved and insulated from the first touch electrodes, the second touch electrodes are in one-to-one correspondence with the second signal wiring, and one end of each of the second signal wiring is electrically connected to the second touch electrode, and an other end thereof is located in the pin area of the base substrate to form a second pin, the detection wiring has a plurality of bending portions distributed along an extending direction of the peripheral wiring area of the base substrate, each of the plurality of bending portions has a first touch electrode sensing portion that forms a first sensing capacitor by cooperating with a first touch electrode of the first touch electrodes to, and a second touch electrode sensing portion that forms a second sensing capacitor by cooperating with the second touch electrode.

11. The method of claim 10, wherein the first touch electrode and the first signal wiring are in the same layer.

12. The method of claim 10, wherein the second touch electrode, the second signal wiring and the detection wiring are in the same layer.

13. The method of claim 10, further comprising: forming a second insulating layer on the second touch electrode, the second signal wiring and a layer of the detection wiring.

14. The method of claim 10, wherein there is a gap between an end of the first touch electrode and an end the second touch electrode, and a portion of the plurality of bending portions of the detection wiring extends into the gap.

15. The method of claim 14, wherein each of the plurality of first touch electrodes is electrically connected to each other by a plurality of diamond electrode blocks; each of the plurality of second touch electrodes is electrically connected to each other by a plurality of diamond electrode blocks; and the gap exists between an end portion of an orthographic projection of each of the second touch electrodes on the base substrate and an end portion of an orthographic projection of one of the plurality of first touch electrodes at a corresponding position on the base substrate.

16. The method of claim 15, wherein a bending portion of the plurality of bending portions of the detection wiring corresponds to the gap one to one, and in each pair of mutually corresponding bending portions and gaps, an end portion of the bending portion extends into the gap.

17. The method of claim 14, wherein each of the plurality of first touch electrodes has a strip shape, and each of the plurality of second touch electrodes has a strip shape.

18. The method of claim 17, wherein the bending portion of the detection wiring corresponds to the gap one to one, and in each pair of mutually corresponding bending portions and gaps, an end portion of the bending portion extends into the gap.

* * * * *